US006257775B1

United States Patent
Scholz et al.

(10) Patent No.: US 6,257,775 B1
(45) Date of Patent: Jul. 10, 2001

(54) MIRROR-REFLEX CAMERA

(75) Inventors: Erwin Scholz, Wolfenbuettel; Joerg Tiedemann, Braunschweig, both of (DE)

(73) Assignee: Rollei Fototechnic GmbH, Braunschweig (DE)

( * ) Notice: Subject to any disclaimer, the term of this patent is extended or adjusted under 35 U.S.C. 154(b) by 0 days.

(21) Appl. No.: 09/433,337

(22) Filed: Nov. 4, 1999

(30) Foreign Application Priority Data

Nov. 5, 1998 (DE) .............................................. 198 50 894

(51) Int. Cl.⁷ ............................. G03B 19/12; G03B 17/00
(52) U.S. Cl. ............................................. 396/358; 396/447
(58) Field of Search ................................... 396/354, 358, 396/447

(56) References Cited

U.S. PATENT DOCUMENTS

| 3,008,397 | * | 11/1961 | Winkler ................................. 396/447 |
| 5,121,148 | * | 6/1992 | Windeler et al. ..................... 396/447 |
| 5,715,003 | * | 2/1998 | Kanno ................................... 396/447 |
| 5,758,217 | | 5/1998 | Mieke .................................... 396/358 |

FOREIGN PATENT DOCUMENTS

| 44 47 092 | 7/1996 | (DE) . |
| 1-134443 | 5/1989 | (JP) . |

* cited by examiner

*Primary Examiner*—David M. Gray
(74) *Attorney, Agent, or Firm*—Foley & Lardner

(57) ABSTRACT

A mirror-reflex camera, having a mirror support which supports a viewfinder mirror and can be adjusted between two end positions, a viewing position and a taking position. Latches are provided with the mirror support for latching in the end positions. Adjustable engaging levers are provided which engage in the latches in an engaging position and release the latches in a release position. A holding device (such as a plate) is provided for holding a driver. The driver can be adjusted along a driver track by a drive and can be moved in the holding device along its driver track within a distance which is limited by two bearing positions in the holding device. The mirror support can be adjusted above the holding device by the driver in these bearing positions. The engaging means, which can, in particular, be pivotable latching levers, can be adjusted from the engaging position into the release position by the driver.

19 Claims, 2 Drawing Sheets

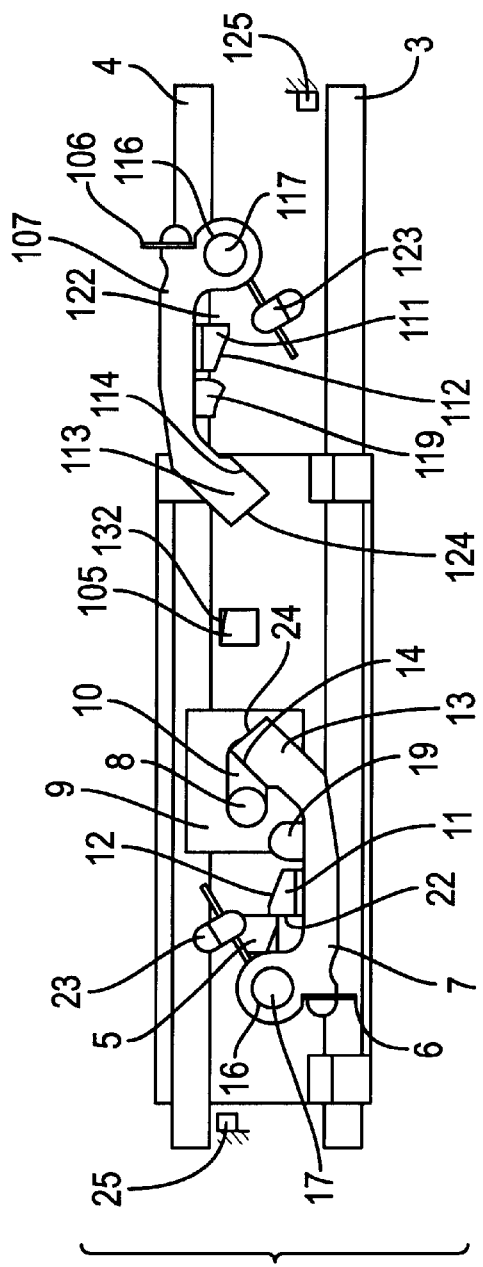
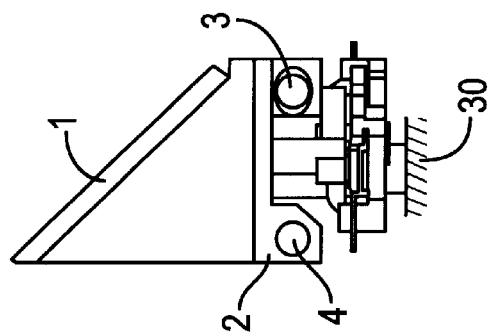
FIG. 2
FIG. 3

MIRROR-REFLEX CAMERA

BACKGROUND OF THE INVENTION

Field of the Invention

The invention relates to a mirror-reflex camera having a mirror support which supports a viewfinder mirror and can be adjusted between two end positions, a viewing position and a taking position.

A conventional mirror-reflex camera is disclosed, for example in DE 44 47 092 A1. In this case, it is usual for the viewfinder mirror to be arranged inside a beam path in the viewing position and outside a beam path in the taking position. This requires the appropriate adjusting movement of the viewfinder mirror and/or of the mirror support supporting the viewfinder mirror, which must be undertaken with adequate speed upon actuating an operator button on the mirror-reflex camera, and yet must ensure reliable adjustment into the two end positions. In this case, accurate positioning of the two end positions is necessary, in particular, so that the beam path is not inadvertently influenced by a maladjustment of the mirror in one of the positions. Moreover, in the case of an electromagnetic drive such as is shown in DE 44 47 092 A1, an appropriate quiescent current is required in general in the end positions or one of the two end positions, in order to hold the viewfinder mirror in the end position or positions.

JP 01-134443 A discloses a mirror-reflex camera, having a mirror support which supports a viewfinder mirror and can be adjusted between two end positions, a viewing position and a taking position, and latches behind mechanical latching means in its two end positions. Adjustable engaging means in the form of pivotable hooks engage in the latching means and release the latching means in a release position. The mirror support has at least a part of the latching means and can be actuated via drive means.

SUMMARY OF THE INVENTION

One object of the present invention is to make available a solution for reliably positioning the viewfinder mirror in its end positions.

According to an embodiment of the present invention, a mirror-reflex camera comprises a mirror support which supports a viewfinder mirror and is adjustable between two end positions, a viewing position and a taking position. In addition, latching means (such as hooks) are provided for latching in the end positions. A holding device (such as a holding plate) holds a driver, with the driver being adjustable along a driver track by a drive and movable in the holding device along the driver track within a distance defined by two bearing positions in the holding device. Adjustable engaging means (such as levers) engage in the latching means in an engaging position and release the latching means in a release position and are adjustable from the engaging position into the release position by the driver. In addition, the mirror support is adjustable above the holding device by the driver in the bearing positions.

According to an embodiment of the present invention, the adjusting movement of the mirror support is therefore performed via a driver which is driven by a drive and, in addition to the adjusting movement of the mirror support, also effects the release of the engaging means from the latching means. Thus, the adjusting movement of the mirror support and the release operation in which the mirror support is released from the latched end positions are performed by a unified movement of the driver.

Thus, in order to release and move the mirror support, there is no need for two operations which are to be carried out sequentially and on the one hand necessitating accurate coordination of the operations to be carried out sequentially, something which leads in general to a time delay in the adjusting movement of the mirror support, since a corresponding adjusting mechanism cannot be activated until after release, and on the other hand sufficient reliability is ensured, since the mirror support cannot already be moved before initiation of the latching operation.

Furthermore, the use of three subassemblies, the mirror support with a holding device and latching means, the engaging means such as, for example, latching levers, and the driver ensure a high reliability against inadvertent release of the mirror support from an end position, which can lead, for example, to inadvertent exposure of the film. Since the driver is arranged in the holding device with a distance, in particular a free play, even severe vibrations do not immediately lead to release of the engaging means.

The engaging means are advantageously arranged pivotably as latching levers, and are correspondingly pivoted into the latching position and release position by the driver. According to another embodiment of the present invention, springs are provided which move the latching hooks into the engaging position: thus, a reliable fixing of the mirror support in the end position is achieved. When the mirror support is moved into an end position, engaging means are first moved in general from the engaging position into a release position before the engaging means in turn latch from the release position into the latching position. The release operation from the latching position into the release position can be achieved as follows: when being moved out, the driver inside the holding device firstly presses against a running-out bevel of the engaging means and thus moves the engaging means from the latching position into the release position, so that it can subsequently move the mirror support via the holding device into the other end position, where a latching operation is initiated, in turn.

When latching, the relevant engaging means can firstly be conveyed from an engaging position into a release position, in order to hold the mirror support together with the holding device and the latching means. In this case, the movement of the engaging means from the latching position into the release position can be effected, on the one hand, by the driver, which presses against a running-in bevel of the engaging means and thus moves the engaging means away, or by the latching means, which press against a bevel of a nose connected to the engaging means, which is connected, in turn, to the engaging means.

The latching mechanism can be used both for a linear displacement of a mirror support between the end positions, and for a pivoting or hinging movement of the viewfinder mirror between the end positions.

Further features of the invention form the subject matter of the claims and will be explained in more detail, in conjunction with further advantages of the invention, with reference to an exemplary embodiment.

BRIEF DESCRIPTION OF THE DRAWINGS

Embodiments of the invention, serving as an examples, are illustrated schematically in the drawings, in which:

FIG. 2 shows a bottom view of the arrangement of FIG. 1; and

FIG. 3 shows a side view of the arrangement of FIGS. 1 and 2.

DETAILED DESCRIPTION OF THE PREFERRED EMBODIMENTS

Figure 1:
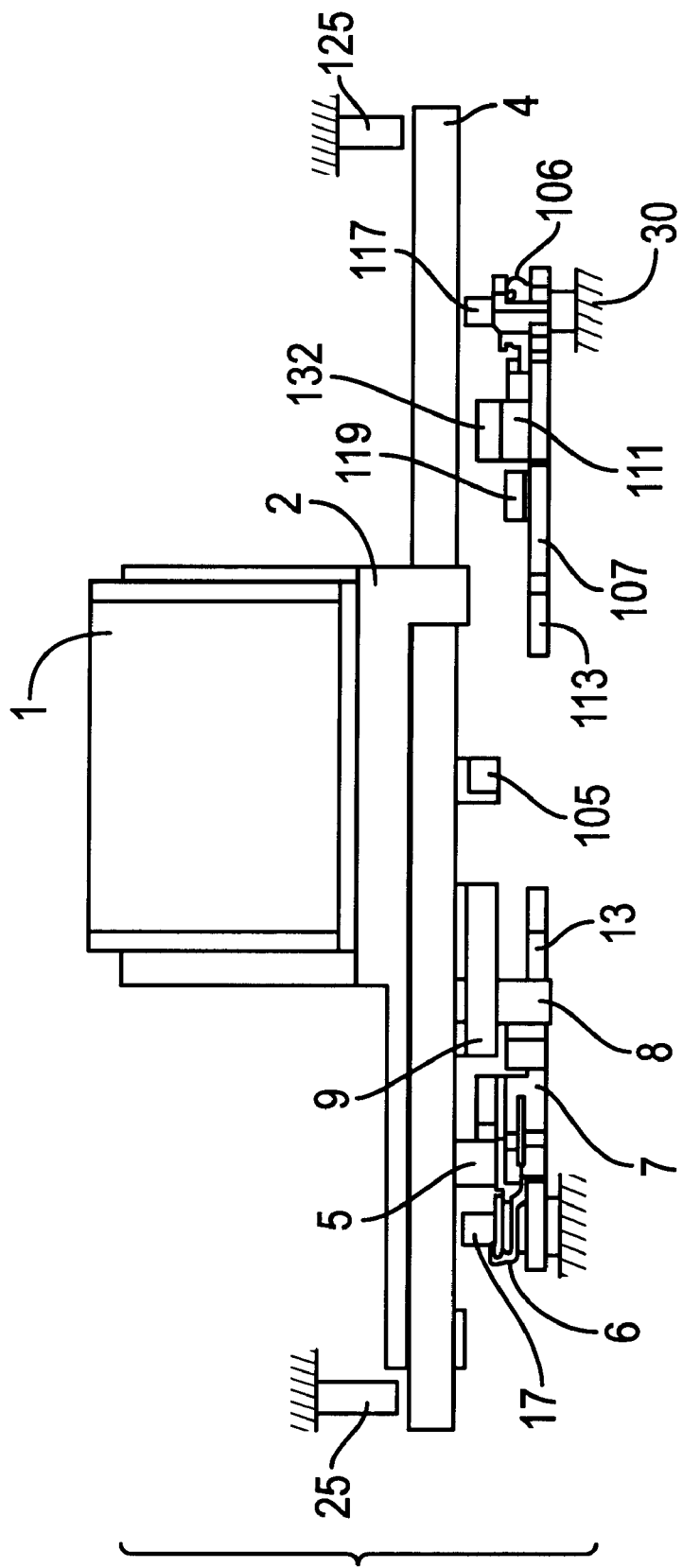
FIG. 1 shows a front view of an arrangement comprising a mirror-reflex camera in accordance with a first embodiment of the invention.

The present invention relates to a mirror-reflex camera having a mirror support which supports a viewfinder mirror and can be adjusted between two end positions, a viewing position and a taking position.

As shown in FIGS. 1 and 2, a viewfinder mirror 1 is coupled to a mirror support 2. Preferably, viewfinder mirror 1 is rigidly fastened on mirror support 2. The mirror support 2 is slidingly arranged on rails 3 and 4 which run parallel to one another in a linear direction, the support in this case advantageously entirely or partially embracing the rails. Provided on the mirror support 2 are latches, such as latching hooks 5 and 105, which are arranged offset relative to one another in the linear direction. A holding plate 9 is connected to the mirror support 2. At its center, it has an elongated hole 10 extending in the linear direction.

Rigidly fastened on a camera housing 30 are bearing pins 17 and 117 which engage in bearing eyes 16, 116 of latching levers 7, 107. The latching levers 7, 107 can be pivoted about the bearing pins 17, 117, preferably in a common plane which runs parallel to the plane defined by the guide rails 3, 4. The latching levers 7, 107 respectively have in a middle region projections (or noses) 11, 111 which on one side have latching edges 22, 122 and on another side bevels 12, 112. The latching lever ends 13, 113 are advantageously arranged in a crank fashion and respectively have running-out bevels 14, 114 and running-in bevels 24, 124, which, in the position of the latching lever which is shown (corresponding to a latching position), run obliquely relative to the said linear direction, advantageously at an angle of in each case 45° to the linear direction. Arranged in addition to the noses 11, 111 are lever stops 19, 119 which are located on the camera housing 30 in the latching positions shown, and define the latching positions. Arranged in the region of the bearing eyes 16, 116 are springs 6, 106 which are fitted at one end in a fashion fixed to the camera housing in housing holders 23, 123, and are fastened at their other end to the latching levers 7, 107 and are biased in such a way that they press the latching levers 7, 107 in to the latching positions shown in FIG. 2.

Projecting in the elongated hole 10 of the holding plate 9, which runs essentially parallel to the plane defined by the guide rails 3, 4, is a driver 8 which can be moved along the linear direction at its lower end by a drive mechanism, the particular drive not being shown in the figures. In accordance with FIG. 2, the driver has an at least essentially circular cross section and can move, advantageously freely, in the linear direction in the elongated hole 10. Its play is fixed in this case by the extent of the elongated hole in the linear direction, as well as by its diameter. A movement transverse to the linear direction is fundamentally impossible, but provided within appropriate tolerances. On the basis of appropriate shaping of the elongated hole 10, it bears in corresponding round ends of the elongated hole 10.

In accordance with FIG. 2, the latching lever 7 projects with its latching lever end 13 next to the driver 8, with the result that an outward movement of the driver 8 from the position shown in FIG. 2 to the right has the effect that the driver 8 presses against a running-out bevel 14 of the latching lever end 13, the effect being to pivot the latching lever 7 away from the latching position. The nose 11 thereby releases the latching hook 5, with the result that the mirror support 2 is now no longer locked. In the event of a further running-out movement of the driver 8 to the right in FIG. 2, it subsequently reaches the other, right-hand end of the elongated hole 10, it being possible to reach this end simultaneously with the release of the latching hook 5 by the nose 11. In the event of a further linear running-out movement, the driver 8 thus drives the holding device 9, and thereby the entire mirror support 2 to the right in FIGS. 1 and 2, as a result of which the mirror 1 is adjusted linearly.

Upon running into the latching position shown on the right in FIGS. 1, 2, the latching lever 107 is initially moved from the latching position, into which it is pressed by the spring 106 into an appropriate release position. This can happen on the one hand, by virtue of the fact that the driver 8 is pressed against the running-in bevel 124 of the latching lever end 113 of the latching lever 107, as a result of which the latching lever 107 is pivoted in turn into the release position, that is to say upwards in FIG. 2. Furthermore, this movement of pivoting the latching lever 107 away can also be performed by the latching hook 105, which is moved to the right with the mirror support 2 and presses with its latching hook bevel 132 against the bevel 112 of the nose 111, with the result that the latching lever 107 can be pivoted away correspondingly in turn. In this case, the arrangement shown can be dimensioned in principle such that the pivoting movement of the latching lever from the latching position shown into the release position can be performed by the driver 8 or the latching hook 105 (or the latching hook 5 in the case of a corresponding inward movement from the right-hand position into the left-hand position) or else by both simultaneously.

After the latching hook 105 has reached an outer right-hand position, the latching lever 107 is released in turn by the driver 8 and/or the latching hook 105, and pressed into the latching position shown by the spring 106. In this case, the latching hook 105 is held between the nose 111 and the stop 125. Since the latching lever 107 is pressed correspondingly downward by the spring 106, it is possible for the latching edge 122 and the stop 125 in the camera housing 30 to achieve a fixing of the mirror support in this right-hand position corresponding to the left-hand position shown in FIG. 1, with the result that the mirror 1 is arranged in a permanently defined position.

Upon being released from this right-hand latching position into the left-hand end position shown in FIG. 2, in accordance with the above-named process, the driver 8 will firstly press against the running-out bevel 114 of the latching lever end 113 and thereby pivot the latching lever 107 upward until the driver 8 in turn reaches the left-hand end of the elongated hole 10 and conveys the holding device 9 together with the mirror support 2 to the left in FIGS. 1 and 2.

In addition to a linear movement, a non-rectilinear movement of the mirror is also possible. Furthermore, a corresponding latching process can also be performed in the case of a rotated, pivoted or hinged viewfinder mirror 1, the latching hooks and the holding plate 9 then running on corresponding circular tracks.

FIG. 3 shows a side view of the arrangement of FIGS. 1 and 2, where viewfinder mirror 1 is coupled to a mirror support 2 that is slideably arranged on rails 3 and 4 which run parallel to one another in a linear direction. Viewfinder mirror 1 and mirror support 2 are coupled to camera housing 30 in the manner described above with respect to FIGS. 1 and 2.

Although the invention has been described above by reference to certain embodiments of the invention, the invention is not limited the embodiments described above. Modifications and variations of the embodiments described above will occur to those skilled in the art, in light of the above teachings. The scope of the invention is defined with reference to the following claims.

German Patent Application No. 198 50 894.8, filed Nov. 5, 1998, including the specification, the drawings, the claims, and the abstract, upon which this application is based, is incorporated herein by reference in its entirety. The U.S. patent application Ser. No. 09/433,337 naming J. Tiedemann as inventor, entitled "Mirror Reflex Camera," filed on the same date as the present application, and is incorporated by reference in its entirety.

What is claimed is:

1. A mirror-reflex camera, comprising:
    a mirror support which supports a viewfinder mirror and is adjustable between two end positions, a viewing position and a taking position;
    latches to latch the mirror support in said end positions;
    a holding device for holding a driver, said driver being adjustable along a driver track by a drive and movable in said holding device along said driver track within a distance defined by two bearing positions in said holding device; and
    adjustable engaging levers which engage in the latches in an engaging position and release said latches in a release position and are adjustable from said engaging position into said release position by said driver, wherein said mirror support is adjustable above said holding device by said driver in said bearing positions.

2. The mirror-reflex camera according to claim 1, wherein said engaging levers are constructed as latching levers that are pivotable into said engaging position.

3. The mirror-reflex camera according to claim 2, wherein said latching levers are pivotable about bearing pins fixed on a housing side of the camera.

4. The mirror-reflex camera according to claim 1, further comprising:
    springs to exert a force on said engaging levers into said engaging position.

5. The mirror-reflex camera according to claim 1, wherein said engaging levers further include projections for engaging in said latches.

6. The mirror-reflex camera according to claim 5, wherein said projections include bevels over which the engaging levers are moveable into an end position by said driver as said mirror support runs in.

7. The mirror-reflex camera according to claim 5, wherein said projections have latching edges for bearing against said latches in the end positions.

8. The mirror-reflex camera according to claim 1, wherein said engaging levers have running-in bevels over which said engaging levers are moveable into an end position by said driver as said mirror support runs in.

9. The mirror-reflex camera according to claim 1, comprising:
    two latching hooks and two engaging levers respectively engaging in said latching hooks in an end position of said mirror support.

10. The mirror-reflex camera according to claim 1, wherein said engaging levers further comprise:
    running-out bevels, wherein as said driver runs out of an end position in which an engaging lever is latched, said driver is moveable within a distance in said holding device against said running-out bevels, and wherein said engaging levers are adjustable from said latching position into said release position by a sliding of said driver along said running-in bevels.

11. The mirror-reflex camera according to claim 10, wherein said running-out bevels are arranged on ends of said engaging levers.

12. The mirror-reflex camera according to claim 1, wherein said engaging levers further comprise stops for fixing in a latching position.

13. The mirror-reflex camera according to claim 1, wherein said mirror support is linearly displaceable between said end positions.

14. The mirror-reflex camera according to claim 13, wherein two latching hooks are arranged on the mirror support offset relative to one another in a linear direction.

15. The mirror-reflex camera according to claim 14 further comprising a camera housing, wherein said engaging levers are arranged in said camera housing offset relative to one another in said linear direction.

16. The mirror-reflex camera according to claim 13, wherein said mirror support is slidable on two mutually parallel guide rails running in said linear direction.

17. The mirror-reflex camera according to claim 1, wherein said mirror support is pivotable between said end positions.

18. The mirror-reflex camera according to claim 1, wherein said mirror support is hinged between said end positions.

19. The mirror-reflex camera according to claim 1, wherein said latches include latching hooks.

* * * * *